United States Patent
Narayanan et al.

(10) Patent No.: US 8,082,408 B2
(45) Date of Patent: Dec. 20, 2011

(54) SYSTEM AND METHOD FOR RESUMING BACKUP OF A VOLUME AFTER A BACKUP OPERATION PREMATURELY TERMINATES

(75) Inventors: Priyesh Narayanan, Kerala (IN); Sujatha Sivaramakrishnan, Hyderabad (IN)

(73) Assignee: Symantec Operating Corporation, Mountain View, CA (US)

( * ) Notice: Subject to any disclaimer, the term of this patent is extended or adjusted under 35 U.S.C. 154(b) by 842 days.

(21) Appl. No.: 12/164,201

(22) Filed: Jun. 30, 2008

(65) Prior Publication Data
US 2009/0327628 A1 Dec. 31, 2009

(51) Int. Cl.
G06F 12/16 (2006.01)
(52) U.S. Cl. ........ 711/162; 711/114; 707/640; 707/641; 707/649
(58) Field of Classification Search .................. 711/114, 711/161, 162; 707/640, 641, 649
See application file for complete search history.

(56) References Cited

U.S. PATENT DOCUMENTS

| | | | |
|---|---|---|---|
| 7,254,682 B1 | 8/2007 | Arbon | |
| 7,617,414 B2 | 11/2009 | Becker | |
| 7,620,785 B1 | 11/2009 | Coulter | |
| 7,672,979 B1 * | 3/2010 | Appellof et al. | 707/649 |
| 7,694,088 B1 | 4/2010 | Bromley | |

* cited by examiner

Primary Examiner — John Lane
(74) Attorney, Agent, or Firm — Meyertons, Hood, Kivlin, Kowert, Goetzel, P.C.

(57) ABSTRACT

A first snapshot of a volume is created at a first point in time. A first backup operation to backup the volume to a first backup image using the first snapshot is initiated. The first backup operation terminates before completion, e.g., due to a failure. A second snapshot of the volume representing the state of the volume at a second point in time is then created. The second snapshot is used by a second backup operation to resume backing up the volume to a second backup image. The first backup image is then merged with the second backup image.

18 Claims, 8 Drawing Sheets

SYSTEM AND METHOD FOR RESUMING BACKUP OF A VOLUME AFTER A BACKUP OPERATION PREMATURELY TERMINATES

BACKGROUND OF THE INVENTION

1. Field of the Invention

This invention relates to backup software for backing up data on a computer system. In particular, the invention relates to a system and method for resuming backup of a volume including a plurality of files after a first backup operation terminates before completion, e.g., terminates due to a failure.

2. Description of the Related Art

Computer systems often employ backup solutions to backup data in order to protect it against hardware failure or data corruption. Data may be stored in a volume on a computer system in the form of files. Backup techniques for backing up a volume generally operate to create a backup image including all the files in the volume. The backup image may be used to restore the volume to the computer system in the event that it becomes necessary to do so, e.g., if the storage device on which the volume is stored fails, if the volume becomes corrupted, or if a user or software application needs to access the volume as it existed at the time the backup image was created.

As the backup image for the volume is being created, other application programs executing on the computer system may continue to access the volume and may modify the files in the volume. As a result, the backup image may not represent the state of the volume at a single point in time. This may be a problem in some cases, e.g., because different files in the volume may be inconsistent with respect to each other.

Thus, in many applications it is desirable to create a backup image that represents the state of the volume at a single point in time. One technique to accomplish this is to create a copy-on-write (COW) snapshot of the volume and then backup the volume to a backup image using the snapshot.

In normal operation, the backup operation may create a complete backup image of the volume, e.g., a backup image that includes all the files of the volume. However, in some cases it is possible that the backup operation may terminate before backing up all of the files. In this case the backup image will be incomplete and will not represent the volume in its entirety.

SUMMARY

Various embodiments of a system and method for backing up a volume including a plurality of files are described herein. According to one embodiment of the method, a first snapshot of the volume may be created at a first point in time. The first snapshot represents the state of the volume as it exists at the first point in time. A first backup operation to backup the volume to a first backup image using the first snapshot may then be initiated. Thus, each respective file backed up to the first backup image may represent the state of the file as it existed in the volume at the first point in time.

In some cases the first backup operation may terminate before completion, e.g., before all of the files of the volume have been backed up to the first backup image. For example, the first backup operation may terminate abnormally due to a failure. After the first backup operation terminates, the method may operate to create a second snapshot of the volume. The second snapshot may be created at a second point in time subsequent to the first point in time. The second snapshot represents the state of the volume as it exists at the second point in time. The state of the volume at the second point in time may be different than the state of the volume at the first point in time, e.g., due to various software applications modifying files in the volume between the first point in time and the second point in time.

The second snapshot may be used to finish backing up the volume. Once finished, a complete backup image representing the state of the volume at the second point in time will have been created. This is accomplished as follows.

The method may identify a first subset of the files of the volume that were backed up to the first backup image by the first backup operation and were not modified between the first point in time and the second point in time. Since the first subset of the files were not modified between the first point in time and the second point in time, the first subset of the files in the first backup image accurately represent the state of the first subset of the files in the volume at the second point in time. Thus, it is not necessary to backup the first subset of the files again.

The method may also identify a second subset of the files of the volume that were backed up to the first backup image by the first backup operation and were modified between the first point in time and the second point in time. For example, the second subset of the files may have been modified by various software applications while the first backup operation was being performed. Since the second subset of the files were modified between the first point in time and the second point in time, the second subset of the files in the first backup image do not accurately represent the state of the second subset of the files in the volume at the second point in time. This is because the first backup image was created by the first backup operation using the first snapshot, which represented the state of the volume at the first point in time, and the second subset of the files were modified after the first point in time. Thus, in order to produce a complete backup image that represents the state of the volume at the second point in time, it is necessary to backup the second subset of the files again.

The method may also identify a third subset of the files of the volume that were not backed up to the first backup image by the first backup operation. In order to produce a complete backup image that represents the complete volume at the second point in time, it is necessary to backup the third subset of the files since these files have not yet been backed up.

Thus, the method may operate to initiate a second backup operation to backup the second subset of the files and the third subset of the files to a second backup image using the second snapshot. The first backup image and the second backup image may then be merged.

BRIEF DESCRIPTION OF THE DRAWINGS

A better understanding of the invention can be obtained when the following detailed description is considered in conjunction with the following drawings, in which.

Figure 1:
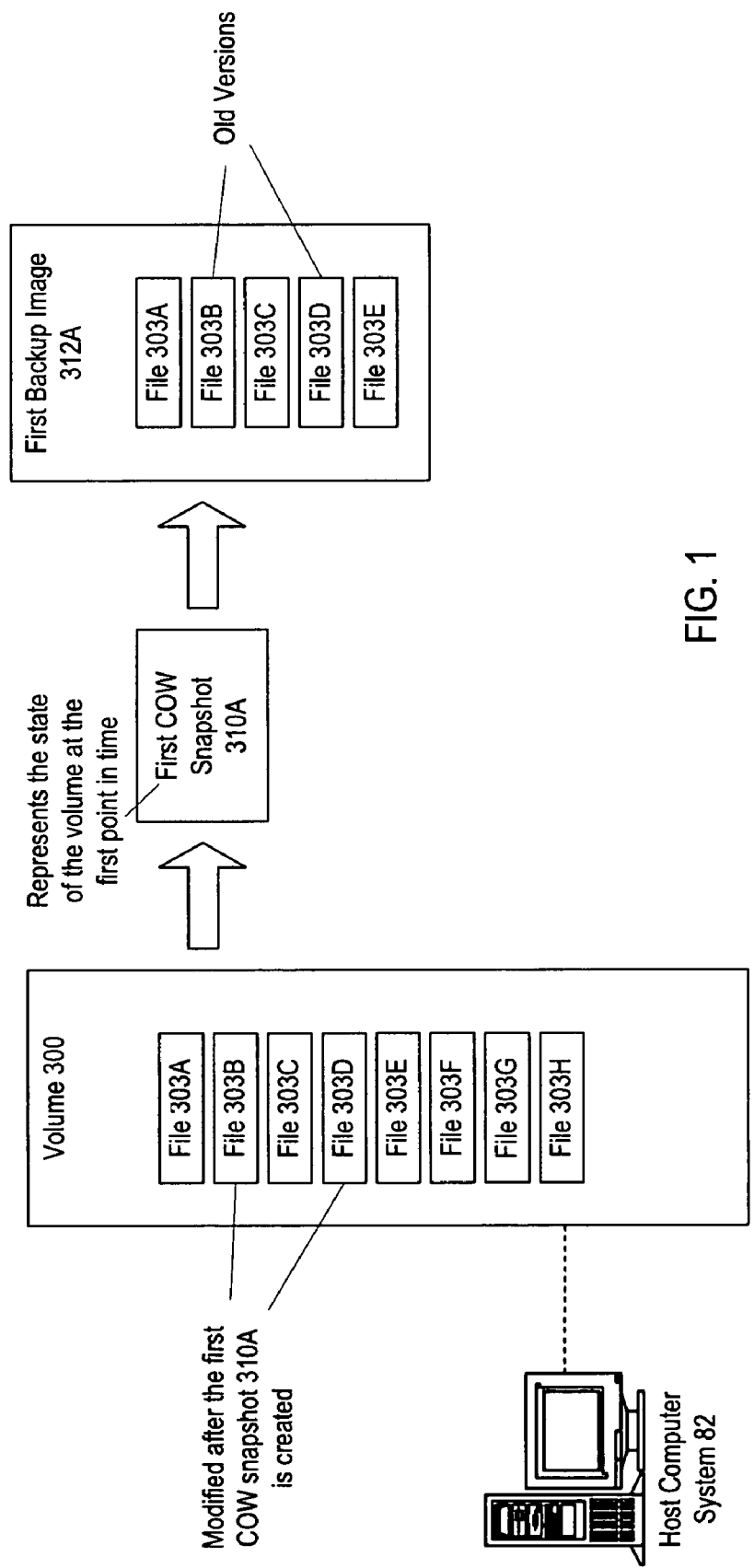
FIG. 1 illustrates a system which implements a method for backing up a volume including a plurality of files.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up a volume including a plurality of files are described herein. According to one embodiment of the method, a first snapshot of the volume may be created at a first point in time. The first snapshot represents the state of the volume as it exists at the first point in time. In some embodiments the first snapshot may be a copy-on-write (COW) snapshot of the volume. In various embodiments, any conventional COW snapshot techniques known in the art may be used to create and maintain the first snapshot.

A first backup operation to backup the volume to a first backup image using the first snapshot may then be initiated. Thus, each respective file backed up to the first backup image may represent the state of the file as it existed in the volume at the first point in time. For example, as known in the art, if the data for a particular file in the volume is modified after the first COW snapshot has been created, the original file data that existed at the first point in time may be copied into the first COW snapshot. Thus, the first backup operation may read modified file data from the first COW snapshot and may read unmodified file data from the volume itself.

In some cases the first backup operation may terminate before completion, e.g., before all of the files of the volume have been backed up to the first backup image. For example, the first backup operation may terminate abnormally due to a failure.

After detecting that the first backup operation terminated before completion, the method may operate to create a second snapshot of the volume, e.g., a second copy-on-write (COW) snapshot. The second snapshot may be created at a second point in time subsequent to the first point in time. Thus, the second snapshot represents the state of the volume as it exists at the second point in time. The state of the volume at the second point in time may be different than the state of the volume at the first point in time, e.g., due to various software applications modifying files in the volume between the first point in time and the second point in time.

The second snapshot may be used to finish backing up the volume. Once finished, a complete backup image representing the state of the volume at the second point in time will have been created. This is accomplished as follows.

In response to detecting that the first backup operation terminated before completion, the method may identify a first subset of the files of the volume that were backed up to the first backup image by the first backup operation and were not modified between the first point in time and the second point in time. (As used herein, a subset of the files means one or more of the files.) Since the first subset of the files were not modified between the first point in time and the second point in time, the first subset of the files in the first backup image accurately represent the state of the first subset of the files in the volume at the second point in time. Thus, it is not necessary to backup the first subset of the files again.

The method may also identify a second subset of the files of the volume that were backed up to the first backup image by the first backup operation and were modified between the first point in time and the second point in time. For example, the second subset of the files may have been modified by various software applications while the first backup operation was being performed. Since the second subset of the files were modified between the first point in time and the second point in time, the second subset of the files in the first backup image do not accurately represent the state of the second subset of the files in the volume at the second point in time. This is because the first backup image was created by the first backup operation using the first snapshot, which represented the state of the volume at the first point in time, and the second subset of the files were modified after the first point in time. Thus, in order to produce a complete backup image that represents the state of the volume at the second point in time, it is necessary to backup the second subset of the files again.

The method may also identify a third subset of the files of the volume that were not backed up to the first backup image by the first backup operation. In order to produce a complete backup image that represents the complete volume at the second point in time, it is necessary to backup the third subset of the files since these files have not yet been backed up.

Thus, the method may operate to initiate a second backup operation to backup the second subset of the files and the third subset of the files to a second backup image using the second snapshot. The first backup image and the second backup image may then be merged. For example, in some embodiments the first backup image and the second backup image may be merged such that a complete backup image representing the volume at the second point in time is created.

Thus, in some embodiments, in response to detecting that the first backup operation terminated before completion, the method may operate to resume backing up the volume as described above in order to finish backing up the volume. In addition, the method may also operate to automatically delete the first snapshot in response to detecting that the first backup operation terminated before completion. For example, where the first snapshot is a COW snapshot, deleting the first snapshot may comprise discontinuing the copying of data from the volume into the COW snapshot in response to the volume data being modified. Deleting the first snapshot may also comprise de-allocating and/or deleting the data in the first snapshot, as well as any data structures used to manage the first snapshot. In some embodiments the first snapshot may be deleted as soon as the termination of the first backup operation is detected, e.g., in order to discontinue the overhead involved in maintaining the first snapshot.

Thus, some embodiments of the method may advantageously operate to re-start and complete the backup of a volume after a first backup operation for backing up the volume terminates before completion. In some embodiments the method may automatically resume backing up the volume as soon as the first backup operation terminates and the first snapshot has been deleted. In other embodiments, the method may resume backing up the volume in response to a request from an administrator of the host computer system. For example, if the first backup operation failed abnormally, the administrator may first fix an underlying hardware or software problem that caused the failure and may then interact with an administrative tool provided by the backup software to request the backup software to resume backing up the volume. In response, the backup software may create the second snapshot of the volume and finish backing up the volume using the second snapshot, as described above.

An alternative technique to resume backing up the volume after the first backup operation terminates could involve persisting or maintaining the first snapshot until the backup of the volume is restarted, and then resuming the backup again using the first snapshot. However, this would require the overhead involved in persisting or maintaining the first snapshot between the time when the first backup operation terminates and the time when the backup of the volume is restarted. This may be especially disadvantageous if the backup of the volume is not restarted until a request from the administrator is received to resume backing up the volume. For example, if a long delay occurs between the time when the first backup operation terminates and the time when the administrator requests to resume backing up the volume then a significant amount of computing resources would typically be required to maintain the first snapshot. The method described above operates to instead delete the first snapshot and then create a second snapshot when the backup of the volume is restarted, thus avoiding the overhead of persisting or maintaining the first snapshot after the first backup operation terminates.

Referring now to FIG. 1, an example of a system which implements an embodiment of the method described above is illustrated. The system includes a host computer system 82 that manages a volume 300 which includes a plurality of files 303, e.g., files 303A-303H in this example.

The volume 300 is stored on one or more storage devices 125 included in or coupled to the host computer system 82. The volume 300 corresponds to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. The volume 300 may be formed from a portion of the overall storage of a physical device, from the storage of an entire physical device, or from the storage of multiple physical storage devices combined.

The host computer system 82 executes backup software 205. The backup software 205 executes to backup the volume 300. For example, as described above, the backup software 205 may create a first COW snapshot 310A at a first point in time. For example, the backup software 205 may request volume management software or other software executing on the host computer system 82 to create the first COW snapshot 310A. In some embodiments the first COW snapshot 310A may be created quickly by simply creating data structures or metadata used to manage the first COW snapshot 310A. After the first COW snapshot 310A has been created, the volume management software or other software may execute to maintain the first COW snapshot 310A, e.g., by copying the original data blocks from the volume 300 into the first COW snapshot 310A when the data blocks are modified and updating mapping information useable to determine which of the data blocks of the volume are in the first COW snapshot 310A and which have not been modified since the first point in time when the COW snapshot 310A was created.

The backup software 205 may then initiate a first backup operation to backup the volume 300 to a first backup image 312A using the first COW snapshot 310A. As used herein, the term "backup image" refers to data created by backing up files. When backing up a particular file from the volume 300, the data blocks for the particular file may be read from the volume 300 if they have not been modified since the first point in time, or may be read from the first COW snapshot 310A if they have been modified since the first point in time.

In the example of FIG. 1, the files 303B and 303D are modified in the volume 300 after the first COW snapshot 310A is created. However, since the first backup operation creates the first backup image 312A based on the first COW snapshot 310A, the first backup image 312A includes the old versions of the files 303B and 303D instead of the modified versions.

In the example of FIG. 1, the five files 303A-303E have been backed up to the first backup image 312A. Thus, the first backup image 312A includes the data for these files. In some embodiments the first backup image 312A may also include other information, such as metadata or catalog information that identifies which files 303 are in the first backup image 312A and where the files are stored.

In this example, the first backup operation terminates after the five files 303A-303E have been copied to the first backup image 312A, e.g., before the other files 303F-303H have been copied to the first backup image 312A. For example, as described above, in some embodiments the first backup operation may abnormally terminate before the volume 300 has been completely backed up, e.g., due to a failure.

Figure 2:
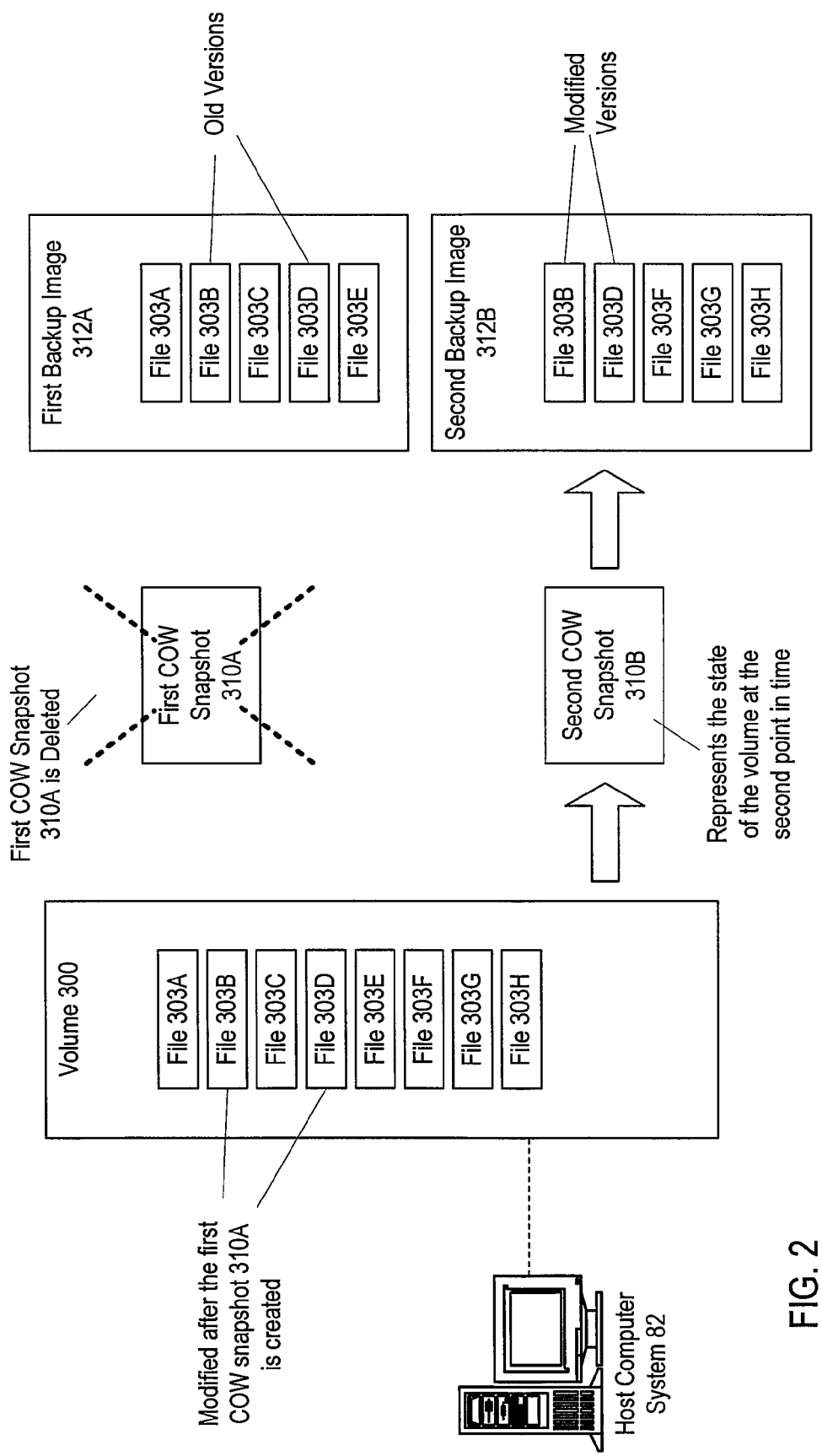
FIG. 2 illustrates a first backup image and second backup image created by the method.

The backup software 205 may detect that the first backup operation terminated, and may delete the first COW snapshot 310A, as indicated in FIG. 2. The backup software 205 may also create a second COW snapshot 310B at a second point in time, where the second COW snapshot 310B represents the state of the volume at the second point in time. As described above, the second COW snapshot 310B may be used to finish backing up the volume 300.

For example, the backup software 205 may identify a first subset of the files of the volume 300 that were backed up to the first backup image 312A by the first backup operation and were not modified between the first point in time and the second point in time. In this example, the first subset of the files includes the files 303A, 303C, and 303E. The backup software 205 may also identify a second subset of the files of the volume 300 that were backed up to the first backup image by the first backup operation and were modified between the first point in time and the second point in time. The second subset of the files includes the files 303B and 303D. The backup software 205 may also identify a third subset of the files of the volume 300 that were not backed up to the first backup image by the first backup operation. The third subset of the files includes the files 303F, 303G, and 303H.

In various embodiments the backup software 205 may use any technique or information in order to determine the first subset, second subset, and third subset of the files. For example, in some embodiments the first backup operation may have stored checkpoint information indicating which of the files of the volume 300 had been copied to the first backup image 312A. As another example, the backup software 205 may use file system information in order to determine which of the files in the first backup image 312A were modified between the first point in time and the second point in time.

The backup software 205 may initiate a second backup operation to backup the second subset of the files and the third subset of the files to a second backup image 312B using the second COW snapshot 310B. In this example, the modified versions of the files 303B and 303D have been backed up to the second backup image 312B, as well as the files 303F, 303G, and 303H.

The backup software 205 may then merge the first backup image 312A and the second backup image 312B. Merging the first backup image 312A and the second backup image 312B may include performing any technique or operation to create a representation of the volume 300 using information from the first backup image and the second backup image. In some embodiments, merging the first backup image 312A and the second backup image 312B may comprise merging the first subset of the files in the first backup image 312A with the files in the second backup image 312B without merging the second subset of the files in the first backup image 312A with the files in the second backup image 312B.

Figure 3:
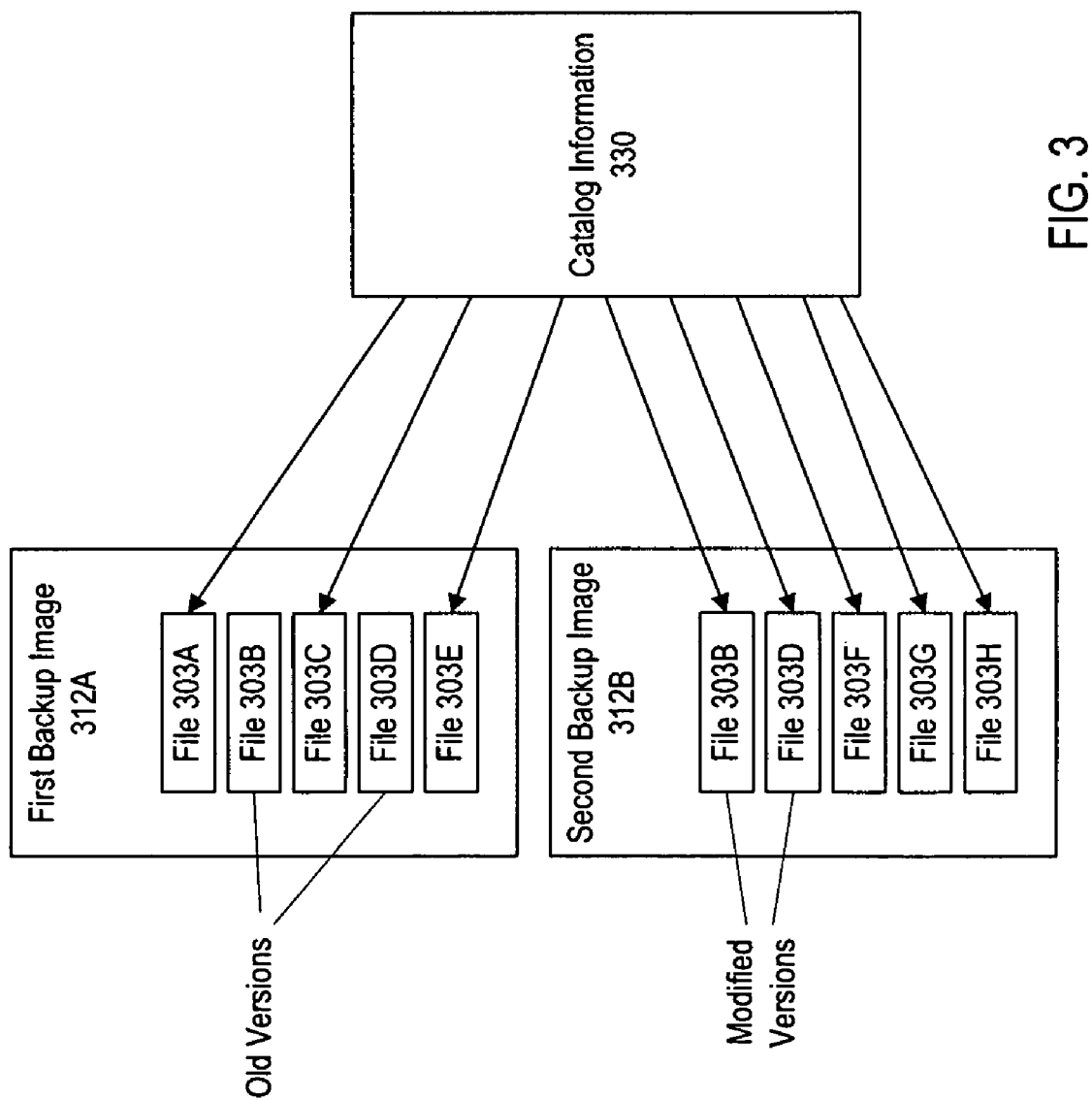
FIG. 3 illustrates catalog information created by merging the first backup image and the second backup image.

For example, in some embodiments merging the first backup image 312A and the second backup image 312B may include creating catalog information 330, as illustrated in FIG. 3. The catalog information 330 may reference files in the first backup image 312A and the second backup image 312B. In particular, the catalog information 330 may reference the first subset of the files in the first backup image 312A and all of the files in the second backup image 312B.

In the example of FIG. 3, the catalog information 330 references the files 303A, 303C, and 303E in the first backup image 312A. However, the catalog information 330 does not reference the old versions of the files 303B and 303D which correspond to the first point in time. Instead, the catalog information 330 references the modified versions of the files 303B and 303D in the second backup image 312B. The catalog information 330 also references the files 303F, 303G, and 303H in the second backup image 312B.

In other embodiments, merging the first backup image 312A and the second backup image 312B may include copying information from the first backup image 312A into the second backup image 312B or into a new composite backup image. In other embodiments, information from the second backup image 312B may be copied into the first backup image 312A or into the new composite backup image. Copying the information from the first backup image 312A or the second backup image 312B may include copying files and/or other information, e.g., metadata.

Figure 4:
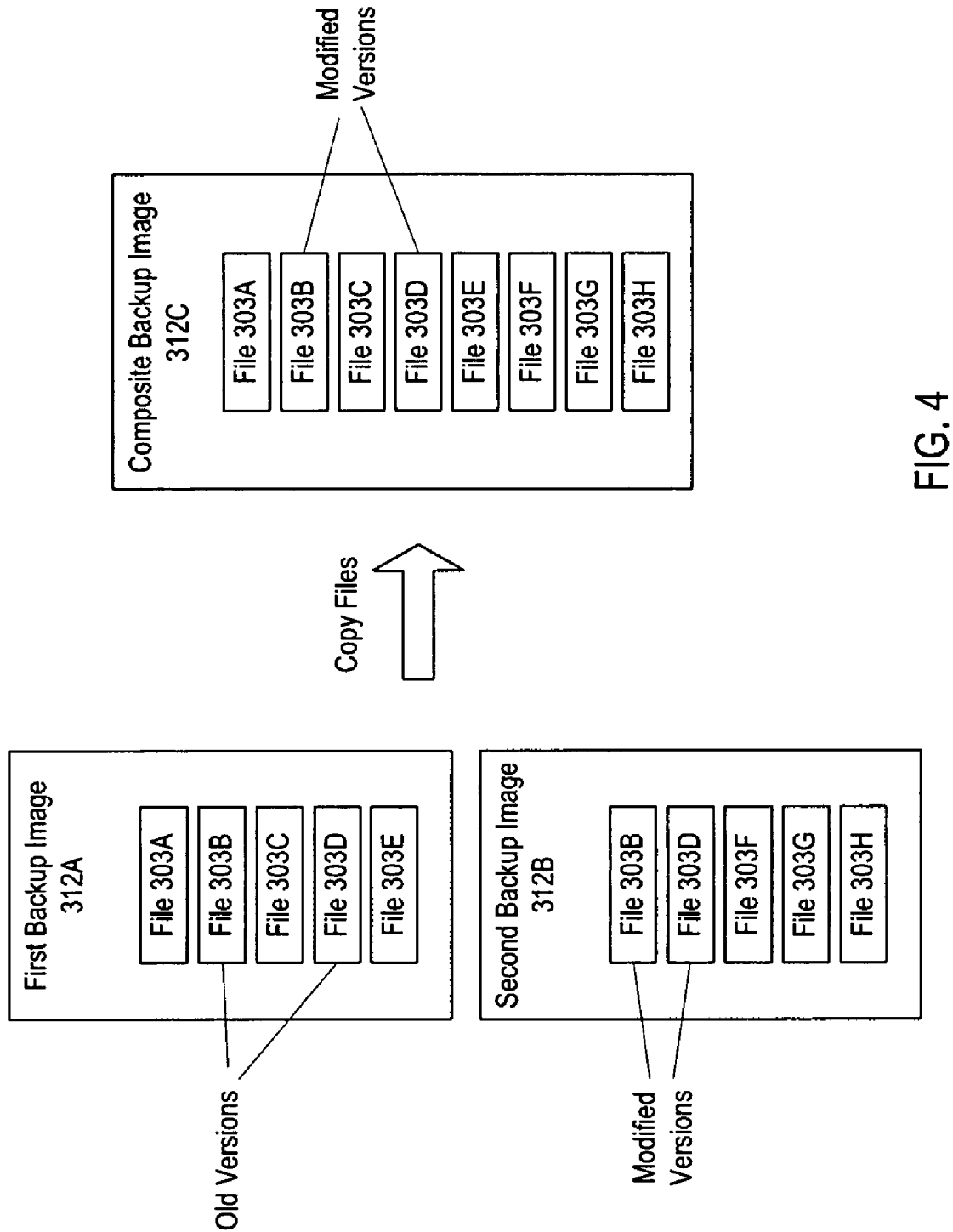
FIG. 4 illustrates copying files from the first backup image and the second backup image into a composite backup image.

FIG. 4 illustrates an embodiment in which files from the first backup image 312A and files from the second backup image 312B have been copied into a composite backup image 312C. As shown, the composite backup image 312C includes the modified versions of the files 303B and 303D from the second backup image 312B, but not the old versions of these files from the first backup image 312A.

Thus, in the examples discussed above, merging the first backup image 312A and the second backup image 312B creates a complete backup image of the volume 300, where the complete backup image of the volume represents the state of the volume 300 at the second point in time.

In further embodiments of the method, some of the information of the first backup image 312A and/or some of the information of the second backup image 312B may be deleted after the merging has been completed. For example, since the old versions of the files 303B and 303D in the first backup image 312A are not used in the merged backup image that represents the state of the volume 300 at the second point in time, the old versions of the files 303B and 303D may be deleted, e.g., to save storage space.

Figure 5:
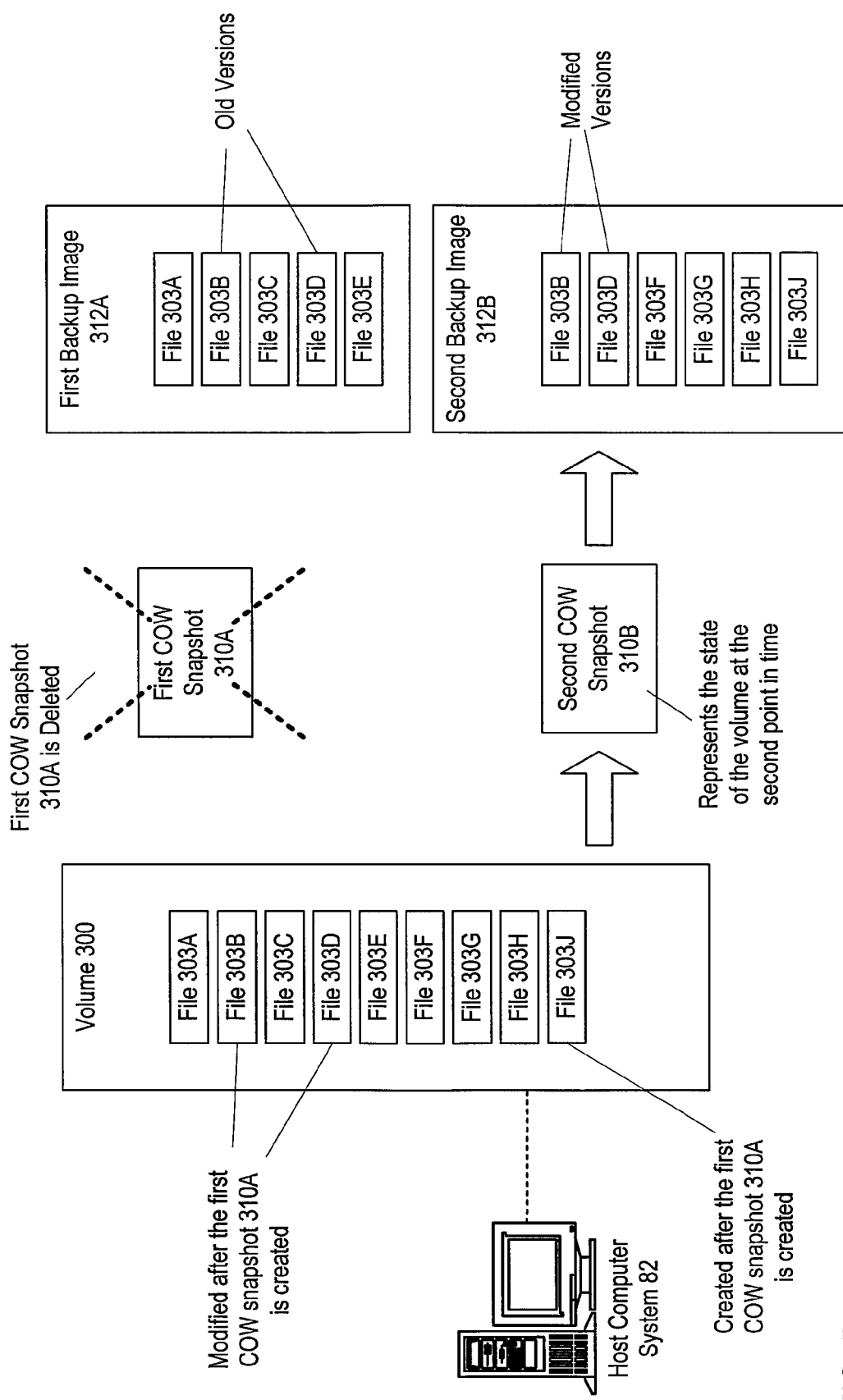
FIGS. 5-7 illustrate further embodiments of the method.

In further embodiments, the backup software 205 may also be executable to identify one or more new files that were created in the volume 300 between the first point in time and the second point in time. In such an embodiment, the second backup operation may operate to backup the one or more new files to the second backup image 312B in addition to the second subset of the files and the third subset of the files. For example, FIG. 5 illustrates an example in which a new file 303J is created in the volume 300 after the first point in time. As shown, the new file 303J has been backed up to the second backup image 312B by the second backup operation. Thus, the new file 303J is merged together with the other files in order to create a complete representation of the state of the volume 300 at the second point in time.

Figure 6:
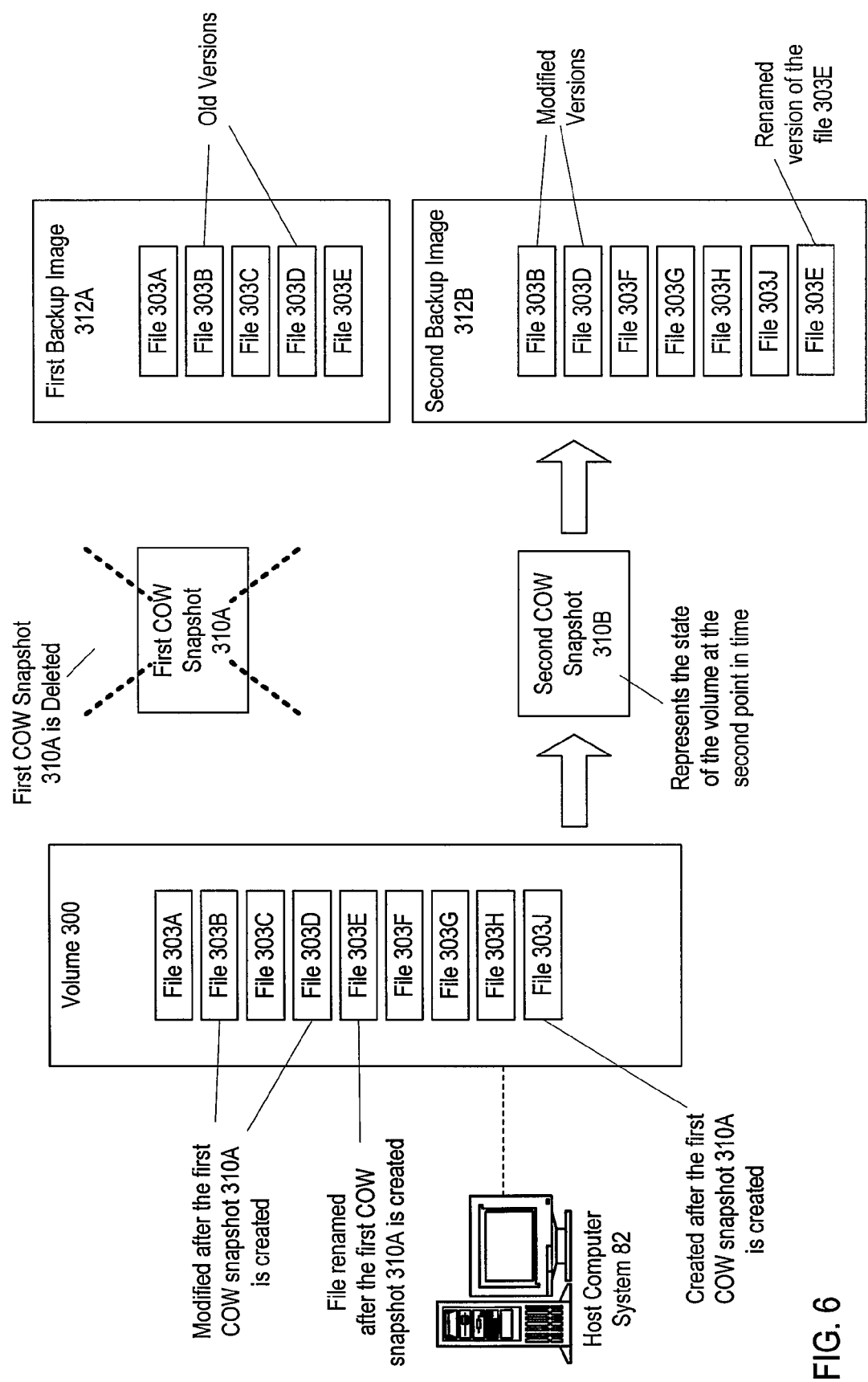

In further embodiments, the backup software 205 may also be executable to identify a fourth subset of the files of the volume 300 that were backed up to the first backup image 312A by the first backup operation and were renamed between the first point in time and the second point in time. The second backup operation may operate to backup the fourth subset of the files to the second backup image in addition to the second subset of the files and the third subset of the files. For example, FIG. 6 illustrates an example in which the file 303E was renamed between the first point in time and the second point in time. As shown, the renamed version of the file 303E has been backed up to the second backup image 312B by the second backup operation. Thus, the renamed version of the file 303E is merged together with the other files instead of the old version of the file 303E being merged, e.g., in order to represent the state of the volume 300 at the second point in time.

Figure 7:
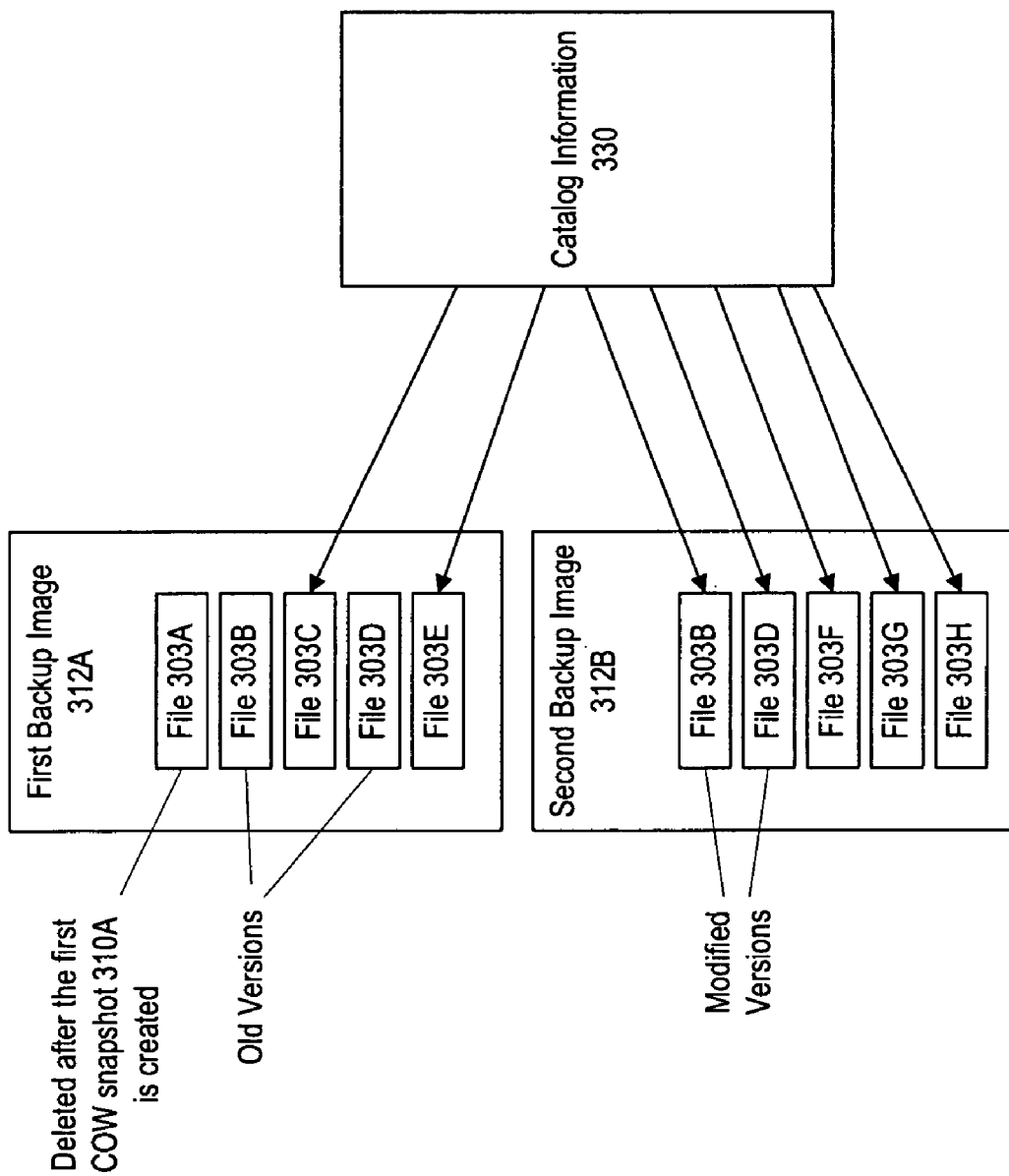

In further embodiments, the backup software 205 may also be executable to identify another subset of the files of the volume that were backed up to the first backup image 312A by the first backup operation and were deleted between the first point in time and the second point in time. In such an embodiment, merging the first backup image 312A and the second backup image 312B may comprise merging the first subset of the files in the first backup image with the second backup image, but without merging the subset of the files in the first backup image that were deleted. For example, FIG. 7 illustrates an example in which the file 303A was deleted between the first point in time and the second point in time. In this example, the catalog information 330 created when the first backup image 312A and the second backup image 312B are merged does not reference the file 303A in the first backup image 312A, because this file was deleted before the second point in time.

Figure 8:
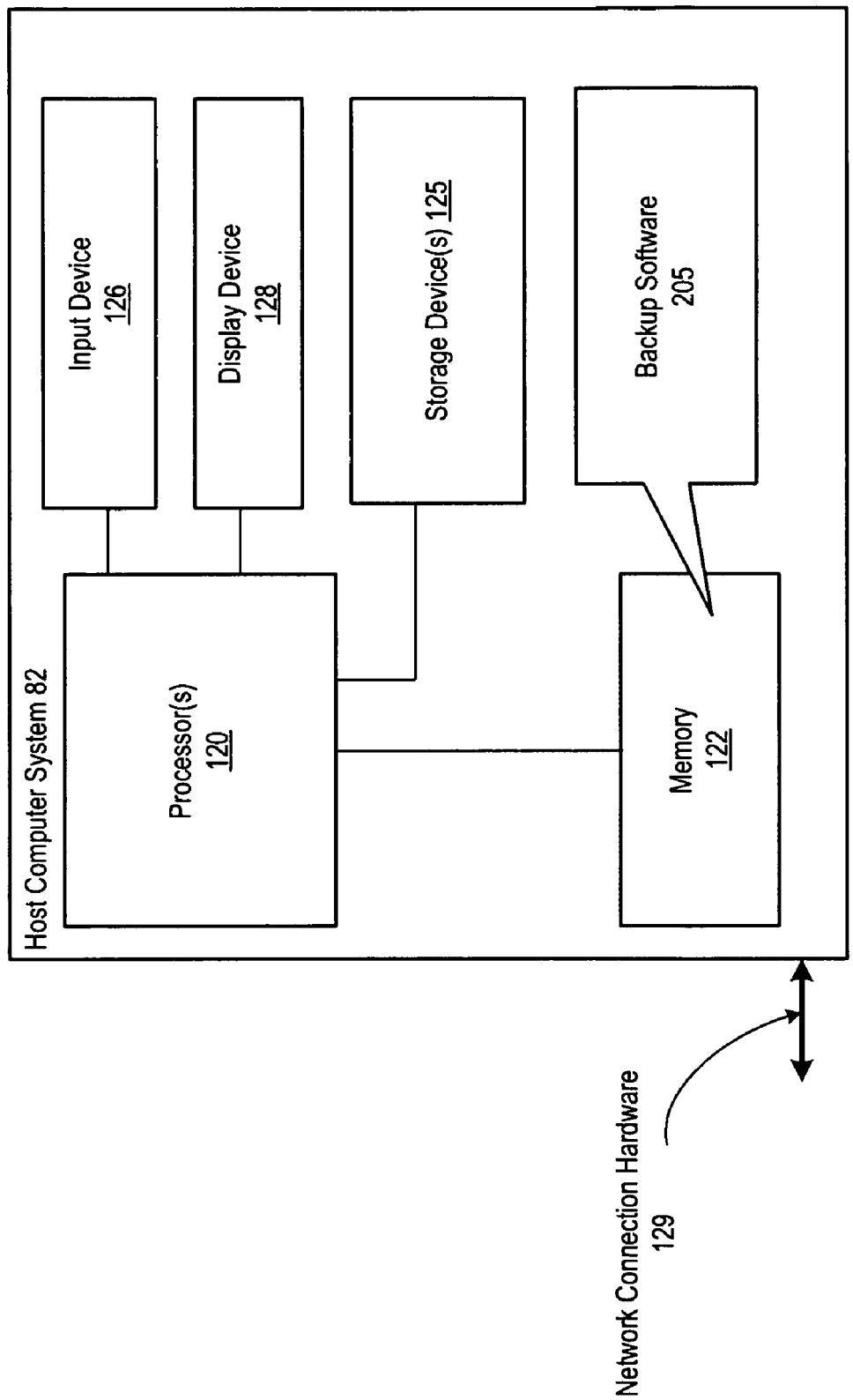
FIG. 8 illustrates one embodiment of a host computer system which executes backup software the implements the method.

In various embodiments, the host computer system 82 may be any type of computer system any may include any type of components or hardware devices. FIG. 8 illustrates an example of the host computer system 82 according to one embodiment. In this example, the host computer system 82 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the backup software 205. The backup software 205 may be executable by the processor 120 to perform the functions described above. The memory 122 may also store other software which operates in conjunction with or which is used by the backup software 205, such as operating system software, file system software, volume manager software, network communication software, device management software, etc.

In various embodiments the backup software 205 may be implemented in any of various ways and may have any desired software architecture. For example, in some embodiments the backup software 205 may be implemented as a single software program. In other embodiments the backup software 205 may be implemented as two or more software programs or modules that operate in conjunction with each other.

Referring again to FIG. 5, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the host computer system 82 may include multiple processors 120.

The host computer system 82 may also include or may be coupled to one or more storage devices 125. The volume that is backed up, the snapshots of the volume, and the backup images created by backing up the volume may be stored on one or more storage devices 125. These components may be stored on the same storage device 125 as each other or may be stored on different storage devices 125.

In various embodiments the storage devices 125 may include any of various kinds of storage devices, such as disk drive devices, optical storage devices, tape storage devices, flash memory storage devices, etc. In one embodiment, the storage devices 125 may include one or more disk drives configured as a disk storage system. In one embodiment, the disk storage system may be an example of a redundant array of inexpensive disks (RAID) system. In another embodiment, the disk storage system may be a disk array, or Just a Bunch Of Disks (JBOD) (used to refer to disks that are not configured according to RAID). In yet other embodiments, the storage devices 125 may include RAM disks, for example. In some embodiments the host computer system 82 may communicate with one or more storage devices 125 through a network.

The host computer system 82 may also include one or more input devices 126 for receiving user input from a user of the host computer system 82. The input device(s) 126 may include any of various types of input devices, such as keyboards, keypads, microphones, or pointing devices (e.g., a mouse or trackball). The host computer system 82 may also include one or more output devices 128 for displaying output to the user. The output device(s) 128 may include any of various types of output devices or display devices, such as LCD screens or monitors, CRT monitors, etc.

The host computer system 82 may also include network connection hardware 129 through which the host computer system 82 connects to a network, e.g., in order to transmit data to or receive data from one or more of the storage devices 125. The network connection hardware 129 may include any type of hardware for coupling the host computer system 82 to the network, e.g., depending on the type of network. In various embodiments, the host computer system 82 may connect to a storage device 125 through any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, the host computer system 82 may be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
    create a first snapshot of a volume, wherein the first snapshot represents a first state of the volume at a first point in time, wherein the volume includes a plurality of files;
    initiate a first backup operation to backup the volume to a first backup image using the first snapshot;
    in response to detecting that the first backup operation terminated before completion:
        create a second snapshot of the volume, wherein the second snapshot represents a second state of the volume at a second point in time;
        identify a first subset of the files of the volume that were backed up to the first backup image by the first backup operation and were not modified between the first point in time and the second point in time;
        identify a second subset of the files of the volume that were backed up to the first backup image by the first backup operation and were modified between the first point in time and the second point in time;
        identify a third subset of the files of the volume that were not backed up to the first backup image by the first backup operation;
        initiate a second backup operation to backup the second subset of the files and the third subset of the files to a second backup image using the second snapshot; and
        merge the first backup image and the second backup image.

2. The computer-accessible storage medium of claim 1, wherein merging the first backup image and the second backup image comprises merging the first subset of the files in the first backup image with the second backup image without merging the second subset of the files in the first backup image with the second backup image.

3. The computer-accessible storage medium of claim 1, wherein merging the first backup image and the second backup image creates a complete backup image of the volume, wherein the complete backup image of the volume represents the second state of the volume at the second point in time.

4. The computer-accessible storage medium of claim 1, wherein the program instructions are further executable to:
    identify one or more new files that were created in the volume between the first point in time and the second point in time;
    wherein the second backup operation initiated by the program instructions operates to backup the one or more new files to the second backup image in addition to the second subset of the files and the third subset of the files.

5. The computer-accessible storage medium of claim 1, wherein the program instructions are further executable to:

identify a fourth subset of the files of the volume that were backed up to the first backup image by the first backup operation and were renamed between the first point in time and the second point in time;
wherein the second backup operation initiated by the program instructions operates to backup the fourth subset of the files to the second backup image in addition to the second subset of the files and the third subset of the files.

6. The computer-accessible storage medium of claim 1, wherein the program instructions are further executable to:
identify a fourth subset of the files of the volume that were backed up to the first backup image by the first backup operation and were deleted between the first point in time and the second point in time;
wherein merging the first backup image and the second backup image comprises merging the first subset of the files in the first backup image with the second backup image without merging the fourth subset of the files in the first backup image with the second backup image.

7. The computer-accessible storage medium of claim 1, wherein merging the first backup image and the second backup image comprises creating catalog information that refers to the first subset of the files in the first backup image and the third subset of the files in the second backup image.

8. The computer-accessible storage medium of claim 7, wherein the catalog information also refers to the second subset of the files in the second backup image.

9. The computer-accessible storage medium of claim 1, wherein merging the first backup image and the second backup image creates a representation of the volume using information from the first backup image and information from the second backup image.

10. The computer-accessible storage medium of claim 1, wherein merging the first backup image and the second backup image comprises one or more of:
copying information from the first backup image into the second backup image;
copying information from the second backup image into the first backup image;
copying information from the first backup image into a third backup image.

11. The computer-accessible storage medium of claim 1, wherein the program instructions are further executable to:
delete the first snapshot in response to detecting that the backup operation terminated before completion.

12. The computer-accessible storage medium of claim 1, wherein the first snapshot comprises a copy-on-write (COW) snapshot of the volume.

13. A system comprising:
one or more processors; and
memory storing program instructions;
wherein the program instructions are executable by the one or more processors to:
create a first snapshot of a volume, wherein the first snapshot represents a first state of the volume at a first point in time, wherein the volume includes a plurality of files;
initiate a first backup operation to backup the volume to a first backup image using the first snapshot;
in response to detecting that the first backup operation terminated before completion:
create a second snapshot of the volume, wherein the second snapshot represents a second state of the volume at a second point in time;
identify a first subset of the files of the volume that were backed up to the first backup image by the first backup operation and were not modified between the first point in time and the second point in time;
identify a second subset of the files of the volume that were backed up to the first backup image by the first backup operation and were modified between the first point in time and the second point in time;
identify a third subset of the files of the volume that were not backed up to the first backup image by the first backup operation;
initiate a second backup operation to backup the second subset of the files and the third subset of the files to a second backup image using the second snapshot; and
merge the first backup image and the second backup image.

14. The system of claim 13, wherein merging the first backup image and the second backup image comprises merging the first subset of the files in the first backup image with the second backup image without merging the second subset of the files in the first backup image with the second backup image.

15. The system of claim 13, wherein the program instructions are further executable by the one or more processors to:
delete the first snapshot in response to detecting that the backup operation terminated before completion.

16. A method comprising:
creating a first snapshot of a volume, wherein the first snapshot represents a first state of the volume at a first point in time, wherein the volume includes a plurality of files;
initiating a first backup operation to backup the volume to a first backup image using the first snapshot;
in response to detecting that the first backup operation terminated before completion:
creating a second snapshot of the volume, wherein the second snapshot represents a second state of the volume at a second point in time;
identifying a first subset of the files of the volume that were backed up to the first backup image by the first backup operation and were not modified between the first point in time and the second point in time;
identifying a second subset of the files of the volume that were backed up to the first backup image by the first backup operation and were modified between the first point in time and the second point in time;
identifying a third subset of the files of the volume that were not backed up to the first backup image by the first backup operation;
initiating a second backup operation to backup the second subset of the files and the third subset of the files to a second backup image using the second snapshot; and
merging the first backup image and the second backup image.

17. The method of claim 16, wherein merging the first backup image and the second backup image comprises merging the first subset of the files in the first backup image with the second backup image without merging the second subset of the files in the first backup image with the second backup image.

18. The method of claim 16, further comprising:
deleting the first snapshot in response to detecting that the backup operation terminated before completion.

* * * * *